United States Patent Office 3,500,039
Patented Mar. 10, 1970

3,500,039
CAR PRESENCE DETECTION SYSTEM
Ralph Kortyna, Turtle Creek, Pa., assignor to Westinghouse Air Brake Company, Swissvale, Pa., a corporation of Pennsylvania
Filed Sept. 12, 1968, Ser. No. 759,422
Int. Cl. B61l 1/16; G06f 15/48; G06g 7/76
U.S. Cl. 246—77          13 Claims

ABSTRACT OF THE DISCLOSURE

This invention relates to a train car presence detection system where the train cars have wheel carrying multiplex axle trucks of varying numbered axles per truck. It includes a pair of wheel detectors positioned apart along the wayside; the distance between the wheel detectors always being less than the distance between the nearest two axles on consecutive trucks on any one given vehicle and less than the distance between a first axle and a last axle on any given truck having more than two axles, the distance between the wheel detectors also being greater than the distance between consecutive wheels on any given truck. The wheel detectors are effective to produce signals indicative of the number of axles passing the wheel detectors. An axle count and car detection decoding unit is electrically coupled to the pair of wheel detectors and has an output indicative of the passing of each of the train cars having the varying number multiple axle trucks.

My invention relates to a vehicle presence detector system.

More specifically, my invention relates to a vehicle presence detector system for use where vehicles having two or three axle trucks, which axles carry wheels, travel along a predetermined way. The system includes first and second wheel detectors, first and second counter units, and an axle number per truck decoder. The first and second wheel detectors are positioned apart along the predetermined way through which the vehicle will pass and are effective to detect the number of axles respectively passing them.

The aforementioned first and second counter units each have a plurality of counting states. The first and second counter units are respectively electrically coupled to the first and second wheel detectors to receive electrical signals which are indicative of the number of axles passing the first and second wheel detectors. Accordingly, these electrical signals determine the counting states of the first and second counter units.

The axle number per truck decoder has first and second states and is respectively electrically coupled to the first and second counter units. The decoder changes states whenever the second counter unit reaches a counting state of two and the first counter is in a counting state of two. The first and second states of the axle number per truck decoder are indicated on outputs from the decoder. These decoder outputs are respectively electrically controllingly coupled to the first and second counter units to allow the first and second counter units to revert to an initial state whenever a vehicle has completely passed the wheel detectors. The second counter unit has an output which indicates the passage of a vehicle.

In the past, train car presence detectors which had the capability of detecting two-axle per truck and three-axle per truck train cars employed two wheel detectors at a specified distance apart in conjunction with logic circuitry which included counters, decoders, timers, etc. These train car pressure detectors of the prior art operated on the principle that if the wheel detectors where spaced apart such that a three-axle truck would initiate simultaneous detection of the first and third axles by the wheel detectors and when a two-axle truck passed, then the wheel detectors would detect the wheels but not simultaneously. Therefore, whenever there was a simultaneous detection of wheels passing the wheel detectors the logic circuitry would record the passage of the three-axle truck and when there was not a simultaneous wheel detection, then the logic circuitry would record the passage of a two-axle truck. There would then follow a truck count which would produce an output indicative of pairs of trucks passing which would give an indication of the passage of a vehicle. However, the train car presence detectors of the prior art fail to take into account that the distance between first and third axles on any two given three-axle trucks of any two given train cars may differ. Similarly, the distance between first and second axles on any two given two-axle trucks of any two given train cars may also differ. Hence, while the axles of one three-axle truck may be displaced such that simultaneous detection by two wayside wheel detectors occurs, the displacement of the axles on another three-axle truck may differ in such a fashion that the wheel detectors may not detect simultaneously. The converse holds true for any two, two-axle trucks. Further complications arise, with reference to both mechanical and electrical layout, because timing circuits must be incorporated to prevent the wheel detectors from seeing a three-axle truck as "three different trucks" due to the fact that while the first and third axles may simultaneously actuate the wheel detectors, the first and second or second and third axles may cause the detectors to treat the three-axle truck as one three-axle truck and two, two-axle trucks. Thus the need for complicated timing circuits is present. Accordingly, the above-noted shortcomings of the prior art, i.e., axle spacing, electrical complexity, mechanical layout, etc. give rise to a need for a train car presence detector which will eliminate such problems. The train car presence detector to be described solves all of these problems in a manner that is unique and heretofore unknown, thereby advancing the state of the art.

It is therefore an object of this invention to provide a vehicle presence detector system that detects a vehicle's passage irrespective of whether or not it has two or three-axle trucks with varying wheel spacings by the utilization of wheel detectors uniquely spaced and cooperatively associated with a pair of counting units and an axle number per truck decoder. The pair of counting units and the axle number per truck decoder constitute an axle count and car detection decoding unit.

Another object of this invention is to provide a train car presence detector that can reliably detect the passage of vehicles having varying multiple axle trucks, which vehicles may be traveling at speeds from one mile per hour to one hundred miles per hour, by the utilization of solid state electronics of the most elementary type.

3

Still another object of this invention is to provide a train car presence detector system which is uniquely adaptable for use with automatic car identification systems where the passage of every car must be determined because when an unmarked or labeled vehicle has passed, this fact must be recorded. This is accomplished by the utilization of a distinctive car presence detection output which may be coordinated with data taken from the label or markings carried by the train car.

In the attainment of the foregoing objects a train car presence detector system has been devised for use in railway systems where there are employed train cars having two-axle trucks as well as three-axle trucks, which axles carry wheels. The novel train car presence detector system includes first and second wheel detectors positioned apart along the way which the train cars will traverse. The distance between the wheel detector is always less than the distance between the nearest two axles on consecutive trucks on any one train car and less than the distance between a first axle and a last axle on any given truck having more than two axles. The distance between wheel detectors must also be greater than the distance between consecutive wheels on any one truck. Accordingly the wheel detectors are effective to detect the number of axles passing.

Also included in the train car presence detector of the instant invention are first and second counter units, each having a plurality of counting states. The first and second counter units are respectively electrically coupled to the first and second wheel detectors to receive electrical signals indicative of the number of axles passing the wheel detectors. The electrical signals determine the counting states of the counters.

The train car presence detector of the present invention further includes an axle number per truck decoder. This decoder has first and second states respectively indicative of the presence of a three-axle truck and a two-axle truck. The decoder is electrically coupled to the first and second counter units to receive an indication of the counting states of the first and second counter units. When the second counter unit reaches a counting state or two and the first counter unit is in a counting state of two, the decoder changes from its first state to its second state. Hence, the decoder has outputs which are indicative of its first and second states and these states are directly determined by the counting states of the first and second counter units. The decoder outputs are, in turn, fed back to the first and second counter units so that whenever a train car has completely passed each of the wheel detectors, the first and second counter units will revert to an initial state.

The second counter unit has an output which is indicative of the passage of a train car. The output of the second counter unit is also electrically controllingly coupled to the axle number per truck decoder to ensure that upon a train car's passage the decoder will be in its first state.

Other objectives and advantages of the present system will become apparent from the ensuing description of illustrative embodiments thereof in the course of which reference is had to the accompaying drawings, in which FIG. 1 illustrates in block diagram form a car presence detection system embodying the invention.

FIG. 2a is a truth table showing the function of a negative logic AND gate.

Figure 3:
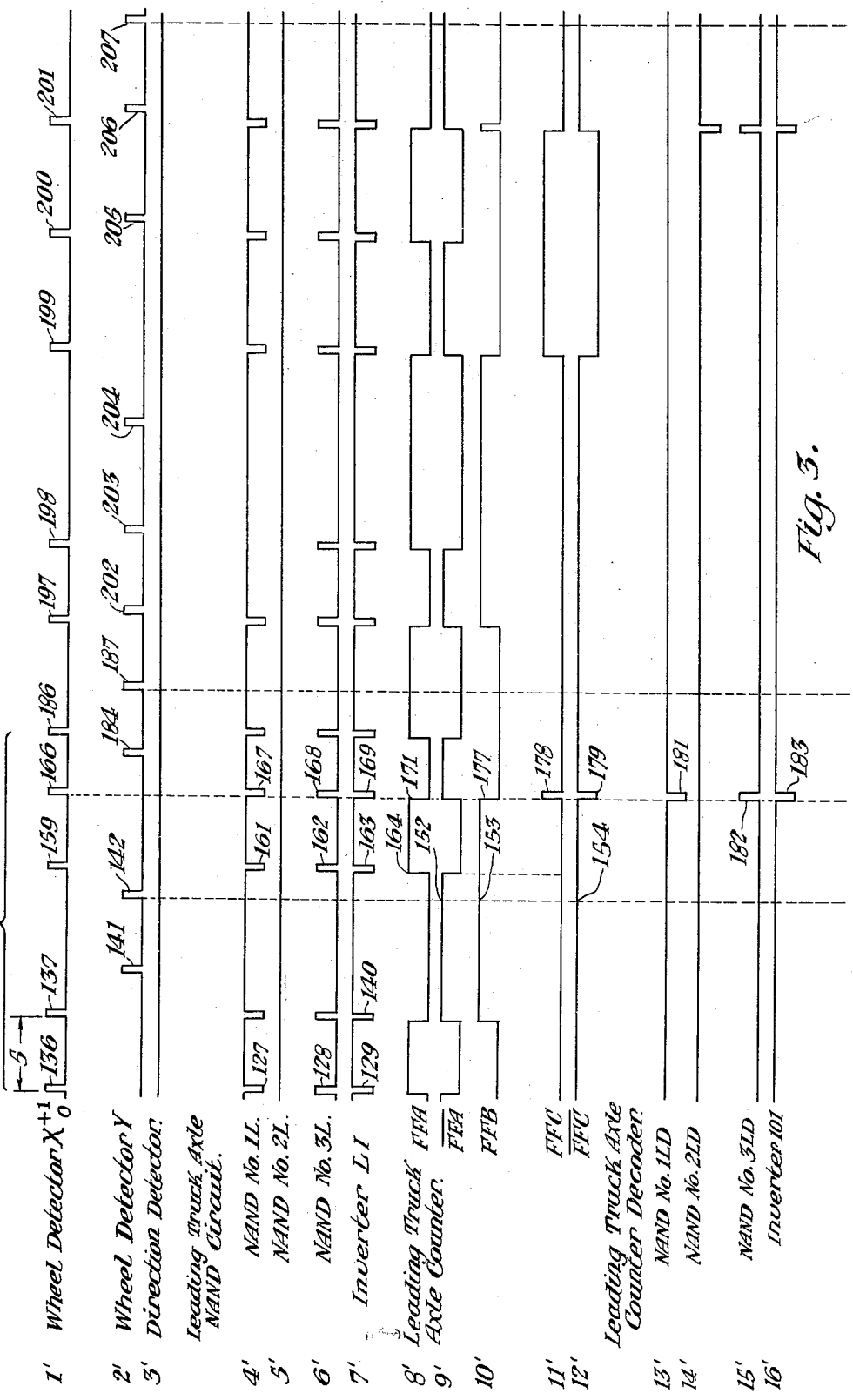
Figure 3A:
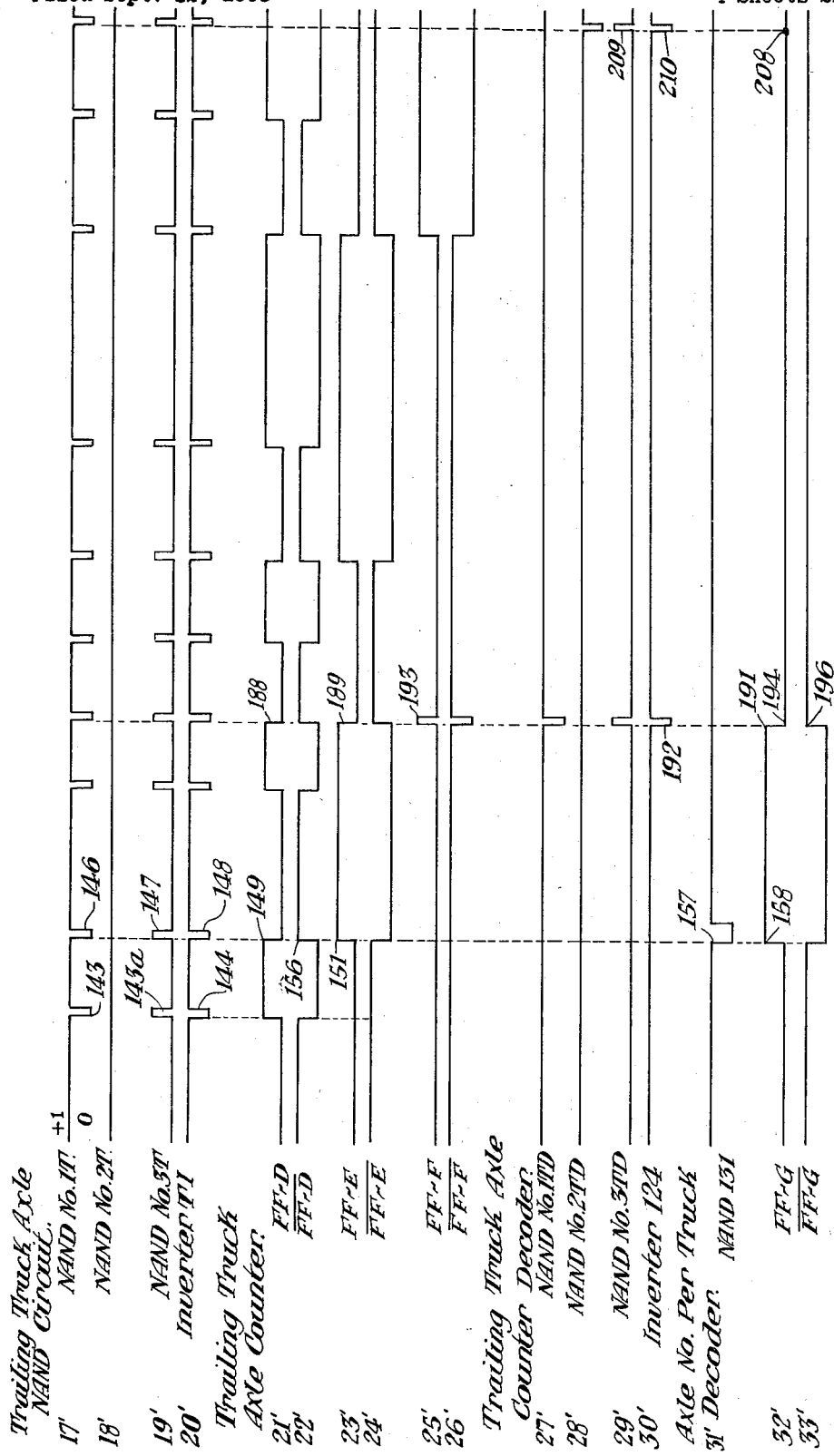

FIG. 3 and FIG. 3a, when positioned with FIG. 3 directly above FIG. 3a, are a timing chart.

A description of the above embodiment will follow and then the novel features of the invention will be presented in the claims.

4
GENERAL SYSTEM DESCRIPTION AND OPERATION

Figure 1:
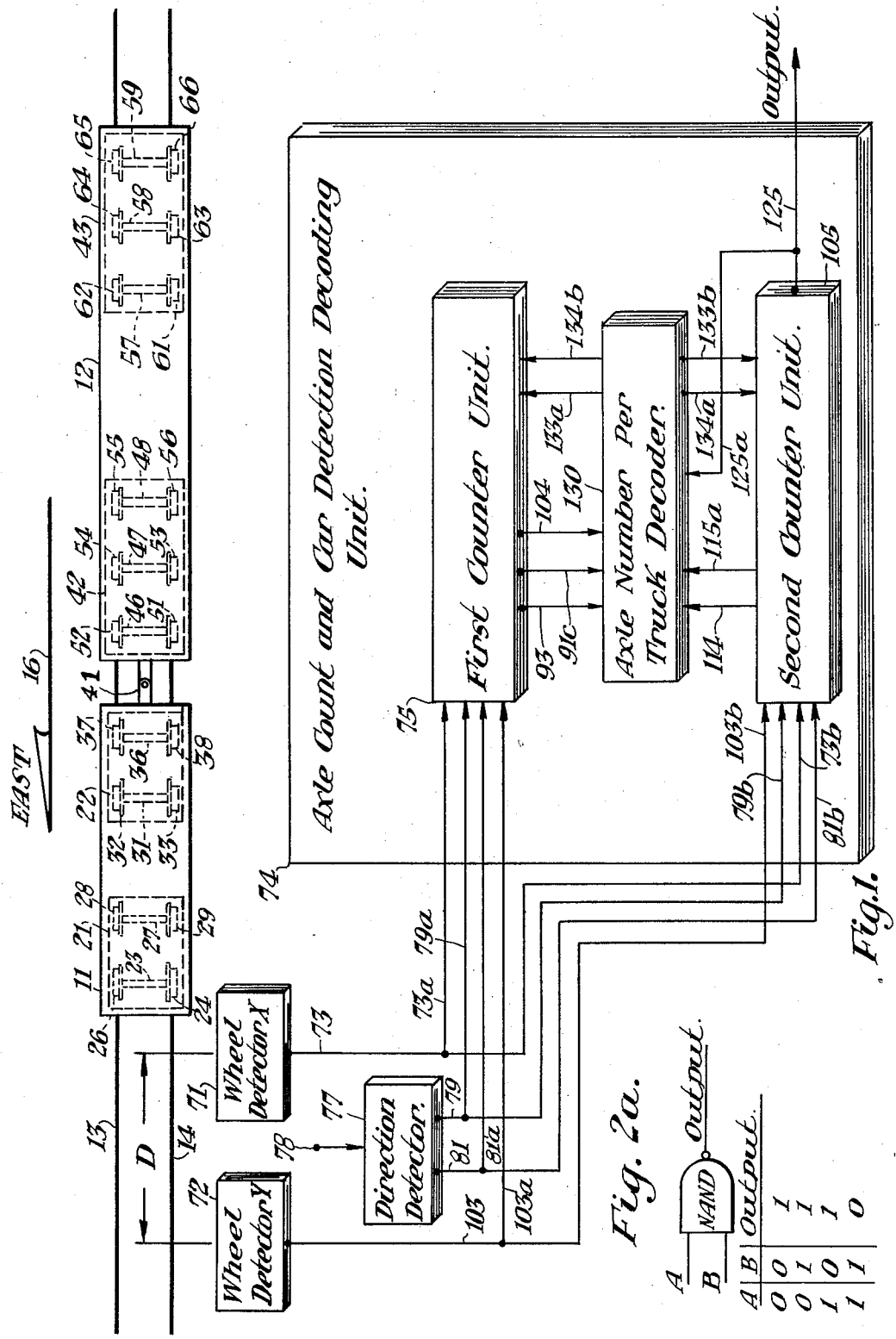

Reference is now made to FIG. 1 in which there is illustrated in block diagram form the system embodying the invention. Basically this illustration sets forth the principal elements involved in the car presence detection system embodying the invention. It will be noted that there are illustrated in schematic form a train car 11 and a train car 12 traveling in the direction shown by the arrow 16. The cars 11 and 12 are traveling along the rails 13 and 14. There is shown in dotted outline within the cars 11 and 12 the wheels, axles, and trucks of each car. Within the outline of car 11 there is depicted two-axle trucks 21 and 22, the truck 21 having an axle 23 which carries wheels 24 and 26, as well as an axle 27 carrying wheels 28 and 29. The car truck 22 has axles 31 and 36, respectively, carrying wheels 32, 33 and 37, 38. The car 12 depicts a three-axle truck arrangement in which there are two trucks 42 and 43. Truck 42 carries axles 46, 47 and 48 and these axles respectively carry wheels 51, 52; 53, 54; 55, 56. Truck 43, in a similar fashion, has three axles 57, 58 and 59 carrying respectively wheels 61, 62; 63, 64; 65, 66. This illustration only depicts two cars, one having two-axle trucks and another having three-axle trucks. For reasons that will become more evident hereafter, this system may be expanded to include the situation where the cars passing through the car presence detection system may include four-axle trucks, but only two-axle and three-axle trucks have been depicted here in order to facilitate and minimize the details necessary in the explanation of the invention to be described more fully hereafter.

The train cars 11 and 12 are coupled together by a coupling link 41, shown only in schematic form, as the coupling link between the cars 11 and 12 is conventional. The cars 11 and 12, as noted earlier, are traveling in a direction from right to left, as FIG. 1 is viewed, and are approaching a pair of wheel detectors 71 and 72, referred to respectively as wheel detector X and wheel detector Y. These wheel detectors will be alternatively referred to throughout the specification either by the reference numeral designation or as detectors X and Y. The spacing of these wheel detectors 71 and 72 is critical to the implementation of the invention, and their spacing must meet specified parameters. These parameters are as follows: the distance between the wheel detectors must always be less than the distance between the nearest two axles on consecutive trucks. By this it is meant that if car 11 is studied, the spacing between the wheel detectors referred to by the designation D must be less than the distance between the axles 27 and 31. In a similar fashion, the distance D between the wheel detectors 71 and 72 must be less than the distance between the axles 48 and 57. In a similar fashion, were there four-axle trucks depicted on a car, this distance D would have to be less than the distance between the nearest two axles on the consecutive trucks of a four-axle per truck vehicle. In addition, the distance D between the wheel detectors 71 and 72 must be less than the distance between the first axle and the last axle on any given truck having more than two axles. This limitation of course is not pertinent to the two-axle per truck vehicle as long as the distance D is less than the distance between the nearest two axles on consecutive trucks. In the case of three-axle trucks, the axles concerned re this last noted parameter are intended to be, for example, on a three-axle truck, the axles 46 and 48 on truck 42 and the axles 57 and 59 on truck 43. One further requirement is that the distance between the wheel detectors also be greater than the distance between consecutive wheels on any given truck. This is true for the situation where there are two-axle trucks, three-axle trucks, as well as four-axle trucks.

Figure 2:
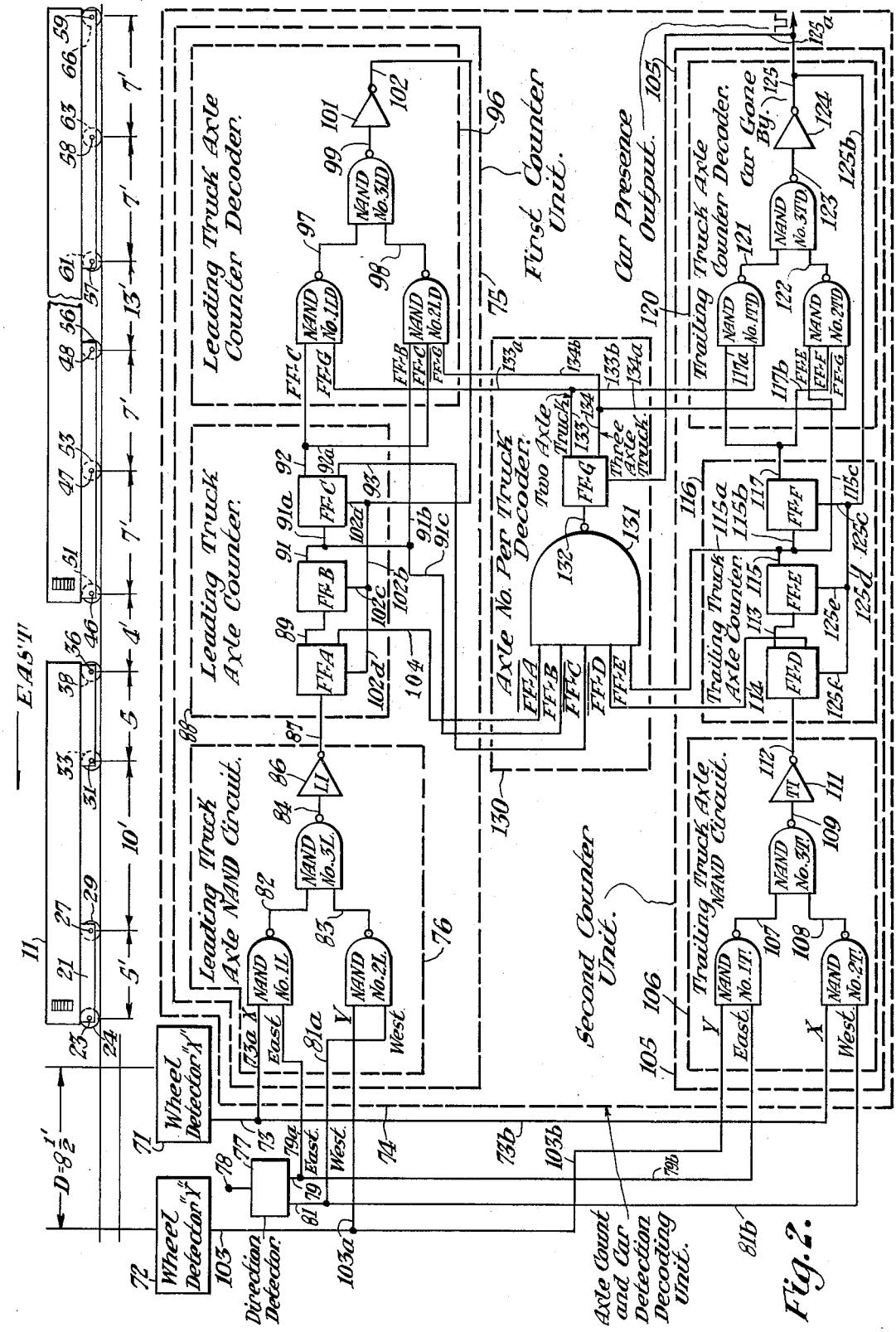
FIG. 2 depicts a complete system including the circuit detail of a preferred embodiment of the invention.

The wheel detectors 71 and 72 are conventional wheel detectors in the sense that they may be of any of the types that produce an electrical signal when a vehicle wheel passes the wheel detector. They may be of the electromagnetic proximity type, which are well known in the art, or they may even be the treadle type which are activated by the passage of a wheel over a treadle. Accordingly, the wheel detectors 71 and 72 produce an electrical signal or pulse, as it may be termed, each time a wheel passes by the wheel detector. Keeping in mind the wheel detector spacing parameters noted above it is obvious that wheel detector 71, which is the wheel detector referred to here as X, will produce the first pulse, and the wheel detector 72, which is the wheel detector referred to here as Y, will only be actuated once both the axles of the two-axle truck 21 of the car 11 have completely passed wheel detector X. A detailed sequence of pulses with respect to the passage of the wheels and their effect on the rest of the system will be spelled out in great detail when FIGS. 2, 3 and 3a are discussed hereafter, these figures containing the circuit details essential to carry out the invention in its preferred embodiment.

It will be seen that the wheel detector 71, which is wheel detector X, has a lead 73 emanating therefrom, which lead enters the axle count and car detection decoding unit 74 and its first counter 75 via leads 73, 73a, and to a second counter 105 via the leads 73, 73b. In a similar fashion, wheel detector 72, which is wheel detector Y, is electrically coupled to the first counter unit 75 and the second counter unit 105 via the leads 103, 103a and 103, 103b.

Positioned immediately beneath the wheel detectors 71 and 72 in this figure is shown what is termed the direction detector which has an input lead 78 and a pair of output leads 79 and 81. This direction detector in practice may be an elementary flip-flop circuit, which flip-flop circuit would provide the basic function of placing an output alternatively on leads 81 and 79, depending upon the direction in which the train cars were approaching the wheel detectors X and Y. While not shown in this figure, it is to be understood that the input lead 78 might be electrically coupled to a track circuit which would be integrated with the rails 13 and 14 and which would sense which direction the train was traveling. In this case the train cars 11 and 12 are approaching the wheel detectors from their right and we have designated this, for purposes of explanation only, to be the easterly direction. It should be understood of course that the manner in which the direction of the vehicle is determined, whether it be by track circuit or other means which sense the presence of the vehicle approaching, forms no part of this invention other than to condition the car presence detection system to be in a state receptive to the consecutive repetitive passage of the wheels and their related trucks. This direction detection provides the system with the maximum capability of determining a car's presence irrespective of the direction in which the vehicle passes the wheel detectors. The direction detector 77 will have an output on the leads 79 and 79a to the first counter unit 75 and simultaneously have outputs on the leads 79 and 79b to the second counter unit 105. In the event that the vehicle is traveling in a westerly direction, the signal that would appear would be on the leads 81 and 81a to the first counter 75 and on the leads 81 and 81b to the second counter 105. The cooperative function of these signals will be explained in more detail with reference to the description that will follow with reference to FIG. 2.

As has been noted, the wheel detectors 71 and 72 are effective to detect the number of axles respectively passing them, and as has been noted these wheel detectors are electrically coupled to the first and second counter units 75 and 105. Each of these counter units 75 and 105 has a plurality of counting states and they receive electrical signals from the wheel detectors 71 and 72, and these signals from the wheel detectors determine the counting states of the first and second counter units 75 and 105.

Interposed between the first counter unit 75 and the second counter unit 105 is an axle number per truck decoder 130. These three basic units, namely, the first and second counters 75 and 105, as well as the axle number per truck decoder 130, constitute what is to be termed hereafter as the "axle count and car detection decoding unit" 74. The exact details of the cooperation of these three components will be spelled out more clearly hereafter.

Broadly speaking, the axle number per truck decoder 130 has a first and a second state and is respectively electrically coupled to the first and second counter units by electrical leads 93, 91c and 104 and by leads 114 and 115a. The axle number per truck decoder 130 changes states whenever the second counter 105 reaches a counting state of two and the first counter 75 is in a counting state of two. This will occur when wheel detector 71 and wheel detector 72 have each respectively detected the presence of two axles passing each of them before the presence of a third axle has been detected by the wheel detector 71. The first and second states of the axle number per truck decoder 130, deferred to above, are indicated on outputs 133a, 134b and 134a, 133b and these outputs are respectively electrically controllingly coupled to the first and second counter units 75 and 105, and provide a controlling output that conditions the first counter unit 75 and the second counter unit 105 to revert to an initial counting state whenever a vehicle has completely passed wheel detectors 71 and 72.

It should be noted that the second counter unit 105 has an output which appears on a lead 125 which is indicative of the passage of a vehicle. It should also be noted that there is a lead 125a which electrically couples the output from the second counter unit 105 to the axle number per truck decoder 130 to ensure that the axle number per truck decoder is in its first state referred to above after the passage of each car.

SYSTEM CIRCUIT DESCRIPTION

Reference is now made to FIG. 2 and FIG. 2a, FIG. 2 depicting the circuit detail of the system shown in block diagram form in FIG. 1. FIG. 2a is a chart depicting a "truth table" for a negative AND gate typical of that employed in the circuit of FIG. 2. Accordingly, a review of this "truth table" in FIG. 2a shows that whenever an input on lead A or B is either both zero (0) or zero (0) and one (1), the output will be a one (1), and the only instance where a zero (0) output will appear is where both the inputs A and B are one (1). It should be noted that the function of the circuits depicted in FIG. 2 are reflected in a timing chart shown in FIG. 3. For purposes of understanding FIG. 3 it should be recognized that whenever a pulse is depicted as going toward a positive voltage level, this will be considered to be one (1) level or state. Conversely, negative going pulses are to be treated as going to zero (0) level or state.

FIG. 3 and FIG. 3a taken together show the pulse outputs that appear at either the inputs or the outputs of the circuit components listed to the left in these figures. Each line of the timing chart of FIG. 3 has been given a reference character in order to facilitate the description and enhance the ability to describe simultaneous functions that take place at different points in the circuit of FIG. 2.

FIG. 3 specifically is a timing chart which also carries a direct relationship to the physical distance traversed by the wheels of the respective trucks and vehicles moving along the way past the wheel detectors 71 and 72 as shown in FIG. 2. Accordingly, a brief reference will be made to FIG. 3 at this time to point out that the first line 1' of the timing chart has the output from the wheel detector X indicated thereon as positive going pulses, e.g., 136, 137, 159, etc. As noted earlier, pulses that are positive going will be considered to be going from a zero (0) to a one (1) state and one can therefore see that in line 1' the wheel detector X, which is wheel detector 71 of FIG. 2, the appearance and passage of the first wheel 24 of the truck 21 of the car 11 passing wheel detector X would cause a positive going pulse 136 output to appear on the lead 73 and then five feet later, with the passage of the first wheel 24 beyond the wheel detector X, the next wheel 29 of the truck 21 would pass the wheel detector X producing a second pulse 137 shown to be five feet from the first. In other words, this table not only represents the passage of time but is directly related to the distances involved.

Returning now to FIG. 2, it will be noted that the distance D between the wheel detectors 71 and 72 has been selected to be 8½ feet. It has been found that this dimension of 8½ feet meets all the parameters required with reference to spacing between wheel detectors noted earlier for the wheel detectors 71 and 72. This distance between the wheel detectors which have been selected as 8½ feet will always be less than the distance between the nearest two axles of consecutive trucks on any one given vehicle, and is also less than the distance between the first axle and the last axle on any given truck having more than two axles. This distance D is also greater than the distance between the consecutive wheels on any given truck. It should be understood that while the distance of 8½ feet shown here is appropriate for nearly 100% of all the two-axle, three axle and four-axle truck vehicles in the United States, this dimension is not strictly limited to the preferred dimension of 8½ feet as long as the parameters noted for the spacing of the wheel detectors are followed. Accordingly, this dimension may be somewhat smaller or larger depending upon the actual environment in which this car presence detection system is to operate.

It should be further understood that the illustration of FIG. 2 has been selected to point out a preferred embodiment of the invention and is directed to only so much of the circuitry needed to detect two-axle and three-axle truck vehicles. It should be further understood that the addition of an additional counting stage in the leading truck axle counters, as well as the trailing truck axle counters 88 and 116 in FIG. 2, will provide an additional capacity to detect the presence of four-axle truck vehicles, but the circuitry here has been kept to a minimum in order to demonstrate the invention without further complicating the conventional logic that would be necessary to add the additional capacity to detect a vehicle having a pair of four-axle trucks.

In accordance with the description set forth with reference to FIG. 1, an input is received on the terminal 78 of the direction detector 77 which is an indication of the direction in which the vehicle is traveling. In this case, the direction detector 77 may be a flip-flop and for purposes of explanation we have selected the direction for the vehicle to be traveling as east. When a signal is present on terminal 78, there will be a positive going condition or a one (1) state on the output lead 79 of the direction detector 77 and the output on the lead 81 will be a zero (0) at this time. In the event that this system would be handling a train traveling from east to west, there would be a one (1) state on the lead 81 and a zero (0) state on the lead 79.

FIG. 2 shows in dotted outline the basic components illustrated in FIG. 1, namely, the outermost dotted outlined box 74 represents the "axle count and car detection decoding unit" shown in full line form in FIG. 1, while in the upper portion of this figure the "first counter unit" 75 is shown by the dotted outline designated by the reference numeral 75 and the "second counter unit" 105 is represented at the bottom of the figure. Interposed between them in the dotted outlined portion is the "axle number per truck decoder" 130.

The first counter unit 75 contains three sub-component sections, the first of which is referred to as a "leading truck axle NAND circuit" 76 which is electrically connected via the lead 87 to a "leading truck axle counter" 88. The leading truck axle counter 88 is electrically coupled to a "leading truck axle counter decoder" 96 via the leads 92, 92a and 91, 91b.

The first counter unit 75, as was noted with reference to FIG. 1, has four inputs, the first input being from the wheel detector 71 on leads 73, 73a, the second input being from the direction detector flip-flop 77 on the leads 79, 79a, the third input being from the direction detector 77 on leads 81, 81a, and the fourth input being from the wheel detector 72 to the leading truck axle NAND circuit 76 on the leads 103a, 103.

Within the leading truck axle NAND circuit there is a first NAND gate No. 1L, a second NAND gate No. 2L, and a third NAND gate No. 3L. Keeping in mind the truth table of FIG. 2a, it will be apparent that in the event a train is traveling east, there will be a one (1) output present on the leads 79, 79a from the direction detector 77, which one (1) output will be present at the NAND gate No. 1L whenever a train is traveling toward the east. Note also that there will then be a positive going output on leads 73 and 73a at the instant a wheel passes wheel detector 71, which will then establish at the NAND gate No. 1L a condition of having the two inputs both containing a one (1) state and therefore the output on lead 82 will be a zero (0). It will also be further appreciated that in the event the train is traveling toward the east, there will always be a zero (0) output on the leads 81, 81a from the direction detector 77 which creates a situation at NAND gate No. 2L where at all times when a vehicle is traveling toward the east there will be this zero (0) state. Accordingly, the appearance of a zero (0) on the lead 81a entering the NAND gate No. 2L will cause throughout the operation of this circuit a one (1) state to appear on the output lead 83 of NAND gate No. 2L because no change in the input leads 103, 103a will ever establish a condition where there will be both a one (1) state present on leads 103, 103a as well as the leads 81, 81a. Therefore, if reference is made to FIG. 3, it will be noted on line 5' that the NAND gate No. 2L remains in a one (1) state at all times during the travel of this vehicle from the west toward the east.

This NAND gate No. 2L is placed within the circuit to show that this system has a capability of operating in either direction and no further reference to the functioning of the NAND gate No. 2L of the leading truck axle NAND circuit 76 will be made.

At this point it would seem appropriate to refer to the second counter unit 105 which contains a similar trailing truck axle NAND circuit 106. In this case the trailing truck axle NAND circuit contains NAND gates No. 1T, No. 2T, and No. 3T. It is readily evident that the NAND gate No. 2T is also connected to the direction detector flip-flop 77 via the leads 81 and 81b. NAND gate No. 2T of trailing truck axle NAND circuit 106 will always have at its output on lead 108 a one (1) state because of the constant presence of a zero (0) state on input leads 81, 81b and no further discussion will be made of the function of the NAND gate No. 2T as it is evident that this provides a capacity for this system to operate with vehicles traveling in either direction.

Returning now to the leading truck axle NAND circuit 76 and its function: with a one (1) state present on the lead 79a entering NAND gate No. 1L there will be a one (1) state appearing on lead 73a from the wheel detector 71 over the leads 73 and 73a whenever a wheel passes this wheel detector. This will cause a zero (0) to appear on the lead 82 and, as was noted before, this will create a one (1) state which will appear on the output lead 84 of NAND gate No. 3L and this will pass through an inverter 86 which will produce a negative going pulse on the lead 87, which negative going pulse will enter the leading truck axle counter 88 and cause a first flip-flop FF–A to assume a counting state of one (1). The leading truck axle counter 88 is conventional and including three stages, each of which contains a conventional flip-flop, the first being FF–A, the second FF–B, and the third FF–C. This leading truck axle counter 88 will count each of the axles passing the wheel detector 71, and when the first axle 23 with wheel 24 passes the wheel detector 71, the flip-flop FF–A will enter a counting state of one (1). All of the flip-flops are in a zero (0) counting state initially for reasons that will become more clear as the description of the circuit proceeds.

Accordingly, the leading truck axle counter 88 and its flip-flops will go into a conventional counting state with FF–A first being in a one (1) state and with FF–B and FF–C being in a zero (0) state. When two axles have passed wheel detector 71, FF–A will be in a zero (0) state, FF–B will be in a counting state of one (1), and FF–C will be in a counting state of zero (0). This is conventional counter operation and no further description of the changes in states will be made as it is deemed that the operation of such a counter is well known in the art.

The third component of the first counter noted earlier is the leading truck axle counter decoder 96. It is apparent from its appearance that it is a similar circuit to that described with reference to the leading truck axle NAND circuit 76. It should be noted that the leading truck axle counter decoder 96 is not responsive in a directional sense as was the leading truck axle NAND circuit 76. All the components contained therein, namely (the NAND gates No. 1LD, No. 2LD and No. 3LD are essential to the decoding function that is to be performed and will be described hereafter.

This circuit includes NAND gate No. 1LD which has a pair of inputs, one from FF–C on lead 92 and the second on lead 133a from FF–G of the axle number per truck decoder 130. The appearance of the signals and related function of the signals on these two leads 92 and 133a to the NAND gate No. 1LD will be described more fully hereafter. It should be noted that the NAND gate 2LD has three inputs, one from FF–B, one from FF–C, and a third from FF–G, which inputs are on leads 91, 91b; 92, 92a; and 134, 134b, respectively.

At this point it should be noted that whenever the outputs are taken from a flip-flop, they will be designated, for example, as FF–A, FF–B, and FF–C whenever the flip-flop is in what is termed a counting state of one (1). The other outputs from the flip-flops will be referred to, for example, as $\overline{FF-A}$, $\overline{FF-B}$ and $\overline{FF-C}$. By way of example, wherever flip-flop FF–A is in a counting state of one (1) there will be a positive voltage on lead 89 and the output on lead 104 will be at a zero (0) level. When the flip-flop FF–A is in a zero (0) counting state, the output on lead 104 will be a one (1) level and this will be referred to as $\overline{FF-A}$. Accordingly, at no time will both the outputs from any given flip-flop be in a one (1) state at the same time, or conversely in a zero (0) state at the same time. Therefore, the outputs will vary from a zero (0) to a one (1) state in an alternative fashion. The NAND gate 2LD with its three inputs will only have a zero (0) output when all of the inputs are in a one (1) state. Accordingly, when there is a one (1) output on lead 97 from NAND gate No. 1LD and a one (1) on lead 98 from NAND gate No. 2LD, this will produce a zero (0) state on lead 99 from NAND gate No. 3LD which will result in the zero (0) being inverted into a positive going pulse by the inverter 101, which positive going pulse will appear on lead 102. This lead 102 is fed back to the flip-flop FF–C, flip-flop FF–B, and flip-flop FF–A via the leads 102, 102a, 102b, 102c and 102d, and whenever a negative going pulse appears on lead 102, these flip-flops FF–A, FF–B and FF–C will be reset.

As was noted earlier, the first counter unit 75 is electrically coupled via electrical lead 73 to the wheel detector 71 and its basic function, it will be recalled, is to receive the pulses indicative of wheels passing the wheel detector 71 and these pulses will create a plurality of counting states corresponding to the number of axles passing.

It will also be recalled that there is an axle number per truck decoder 130 which is electrically coupled to the first counter unit 75 via the leads 93, 91c and 104, as well as by the leads 133a and 134b. The axle number per truck decoder 130 is also coupled to the second counter unit 105 by the leads 114, 115a and 134a, 133b. A lead 125a serves as a reset link to the output 125 of the second counter unit 105 and the manner in which it functions will be explained more fully hereafter.

The axle number per truck decoder 130 has a NAND gate 131 which has a total of five inputs. The only time that the NAND gate 131 of the axle number per truck decoder 130 will have a zero (0) output, or shall we say a negative going output on the lead 132, will occur when all of the five just noted inputs to the NAND gate are in a positive or a one (1) state. By design, the flip-flop FF–G is initially set so that there is a one (1) output or a one (1) state on the lead 134 from the flip-flop FF–G and a zero (0) state on the lead 133 from the flip-flop FF–G. As the explanation of this circuitry continues, it will become apparent that the only time that there are five positive inputs to the NAND gate 131 is when the wheel detector 71 and wheel detector 72 have both had two wheels and related axles pass them. This will place the first counting unit 75 and its leading truck axle counter 88 in a counting state of two (2) and the second counter unit 105 will have its leading truck axle counter 116 in a counting state of two (2). When this occurs it will be made more evident hereafter that there are five, one (1) state inputs to the NAND gate 131 which produce a negative going pulse on lead 132 which in turn causes the flip-flop FF–G to have a one (1) output on the lead 133. This set of conditions will be treated as being indicative of the consecutive passage of two, two-axle trucks past both the first and the second wheel detectors 71 and 72 and would signify the passage of a train car having a pair of two-axle trucks.

Accordingly, the signal on flip-flop FF–G output lead 134 would go from a one (1) state to a zero (0) state, and by design this condition of going from a one (1) to a zero (0) output on lead 134 is indicative of a change from a three-axle truck to the detection of the presence of a two-axle truck. The cooperative use of the outputs from the flip-flop FF–G of the axle number per truck decoder 130 will be made more clear hereafter when the timing chart of FIG. 3 is studied in conjunction with the passing of a pair of cars past the wheel detectors 71 and 72.

As was noted earlier, the trailing truck axle NAND circuit 106 has three NAND gates, NAND No. 1T, NAND No. 2T, NAND No. 3T, and an inverter 111. The NAND gate No. 3T is coupled to the NAND gate No. 1T and NAND gate No. 2T respectively by the leads 107 and 108. The output of the NAND gate No. 3T appears on the lead 109 and passes through the inverter 111 and this output will appear on the lead 112 emanating from the right side of the trailing truck axle NAND circuit 106 where this output will enter the trailing truck axle counter 116 with its three flip-flops FF–D, FF–E and FF–F. These flip-flops are initially electrically interconnected via the leads 113, 115b and 115, and finally the output from the last flip-flop FF–F will appear on the lead 117 where this output will enter the trailing truck axle counter decoder 120 and be utilized in conjunction with the inputs from the axle number per truck decoder 130 which appear on the leads 134, 134a and 133, 133b from flip-flop FF–G. NAND gate No. 1TD of the trailing truck axle counter decoder 120 has two inputs, one from the last stage of the counter flip-flop FF–F on leads 117, 117a, and one from the output on leads 133, 133b of the flip-flop FF–G of the axle number per truck decoder 130. NAND gate No. 2TD has three inputs, one from the last stage of the counter flip-flop FF–F on leads 117, 117b and a second input from the flip-flop FF–G over the leads 134, 134a, and the third input to NAND gate No. 2TD comes from the second stage of the counter flip-flop FF–E over the leads 115, 115c.

The outputs from the NAND gates Nos. 1TD and 2TD appear respectively on leads 121 and 122 where they enter the third NAND gate No. 3TD. The output from the third NAND gate No. 3TD appears on lead 123 where it passes through an inverter 124, is inverted and provides an output on lead 125 indicative of the car's presence, or as it may be termed "the passage of the car." Whenever a negative going signal appears on this output from the second counter unit 105, there will be an ensured reset of the flip-flop FF–G via the signal appearing on the lead 125a which is coupled to the output 125 of the second counter unit 105, and which output on lead 125a is electrically coupled to the flip-flop FF–G to reset this flip-flop in the event that a two-axle per truck vehicle has gone by both wheel detectors. It will be evident hereafter that the flip-flop FF–G will not require reset as long as three-axle per truck cars continue to pass through the car presence detection system.

The operation of the car presence detecting system will now be described where the trains cars 11 and 12 depicted at the top of FIG. 2 move from the right-hand side to the left. It is quite apparent that the first vehicle or train car 11 has a pair of two-axle trucks 21 and 22, while the second vehicle or train car 12 has a pair of three-axle trucks 42 and 43. It should be noted here that the distance between each of the axles and wheels in this figure is set forth below the rails which support the cars 11 and 12. These distances are typical of those that might be found between axles on a given truck and the distance between trucks on a given vehicle. The second train car 12 is shown for purposes of illustration a having a central portion thereof removed and the dimension of the distance between the axle 48 of the truck 42 and the axle 57 of the truck 43 is hypothetically set at thirteen feet. In the case of the train car 11, the distance between the axles on a given truck is five feet while the distance between the trucks is ten feet. The distance between the axles and related wheels 51, 53 and 56 of the truck 42 is hypothetically selected to be seven feet. It should be noted that these distances are in no way intended to limit the invention so long as the spacing between the wheel detectors 71 and 72 has met the parameters set forth earlier with reference to their spacing.

SYSTEM OPERATION

The description of the functioning of FIG. 2 will be made in conjunction with the timing chart of FIG. 3 and FIG. 3a. Therefore, as the first vehicle 11 and the wheel 24 of the truck 21 pass the first wheel detector 71, which is referred to in FIG. 3, line 1' as wheel detector X, there will be a pulse output 136. When this pulse appears, there will be a one (1) state present on the leads 73, 73a and NAND gate No. 1L of the leading truck axle NAND circuit 76. At the outset it should be recalled that the direction detector 77 has a one (1) state output on leads 79, 79a which is shown on line 3' of FIG. 3. Accordingly, the NAND gate No. 1L has a pair of one (1) states present at its input leads and therefore will have a zero (0) output. This zero (0) output will appear on the lead 82 and be present at NAND gate No. 3L of the leading truck axle NAND circuit 76. This is shown as pulse 127 on line 4' of FIG. 3. Simultaneously, with the zero (0) state on lead 82 to NAND gate No. 3L there will be a one (1) state present on lead 83 as shown on line 5' of FIG. 3. Accordingly, with a zero (0) and a one (1) present on the NAND gate No. 3L there will be a one (1) pulse output on the lead 84 from this gate, which is shown as pulse 128 on line 6' of FIG. 3, and this one (1) or positive going pulse 128 will pass through the L1 inverter 86 as shown on line 7' of FIG. 3 and be inverted to produce negative going pulse 129 on the lead 87. This negative going pulse on lead 87 will trigger the flip-flop FF–A from a zero (0) condition to a one (1) condition.

It must be kept in mind that the leading truck axle counter 88 and its respective flip-flops FF–A, FF–B and FF–C are all in a zero (0) state at the outset of the operation. Therefore, the only effect on the system caused by the passage of wheel 24 past the wheel detector 71 will be the placing of a one (1) condition on flip-flop FF–A of the leading truck axle counter 88. It will be noted that when the wheel 29 passes the wheel detector 71 a second pulse 137, which is shown on line 1' of FIG. 3, will appear and this will in a similar fashion produce a one (1) state on the output of the NAND gate No. 3L on lead 84, and the appearance of a one (1) state will result in inverter 86 having an output which is a negative going pulse 140, which pulse is depicted on line 7' of FIG. 3. This will result in a two (2) count in the leading truck axle counter 88. In other words, flip-flop FF–A will go from a (1) condition to a zero (0) condition while flip-flop FF–B will go to a one (1) condition as a result of the output on flip-flop FF–A's lead 89 going in a negative direction, which transition will cause flip-flop FF–B to go to a one (1) condition.

Therefore, upon the passage of the first truck 21 of the train car 11, there will appear in the leading truck axle counter a count of two (2). It will now be appreciated as one visualizes the train car 11 moving toward the left in FIG. 2, the passage of the wheels 24 and 29 past the wheel detector 72 will result in output pulses from the wheel detector 72, which pulses are shown on line 2' of FIG. 3 as consecutive pulses 141 and 142. The pulses 141 and 142 will appear on leads 103 and 103b from wheel detector 72. The lead 103b enters the trailing truck axle NAND circuit 106 and appears at the NAND gate No. 1T. As has been noted earlier with the train traveling in an easterly direction, there will always be a one (1) state on the lead 79b from the direction detector 77, and this will result in there being present on both inputs to the NAND gate No. 1T a one (1) state caused by a wheel passing detector 72, which will result in a zero (0) state on the output lead 107 from NAND gate No. 1T shown as pulse 143 on line 17' of FIG. 3a.

As has been noted earlier, the NAND gate No. 2T will have a one (1) state output at all times when a vehicle is passing to the east in this embodiment, this being shown on line 18' of FIG. 3a. These inputs to NAND gate No. 3T result in there being a positive going one (1) state output pulse on the lead 109, which positive going pulse is depicted on line 19' of FIG. 3a as pulse 143a. Pulse 143a on lead 109 will pass through the inverter 111 and appear as a negative going pulse 144 shown on line 20' of FIG. 3a. This pulse will produce a change in state of flip-flop FF–D of trailing truck axle counter 116 resulting in the flip-flop FF–D entering a one (1) state, as shown on line 21' of FIG. 3a. Flip-flops FF–E and FF–F will remain in their zero (0) state. Flip-flop FF–D will remain in this state until the appearance of the next pulse from the wheel detector 72. This one (1) state will remain as such until the wheel 29 has passed the wheel detector Y and has produced the pulse output 142 shown on line 2' of FIG. 3. The appearance of the pulse 142 will in turn cause the NAND gate No. 1T to produce a negative going pulse 146 which is shown on line 17' of FIG. 3a.

As has been noted, whenever a negative going pulse appears on lead 107 of the NAND gate No. 1T, there will then be present at the inputs of NAND gate No. 3T a zero (0) state and a one (1) state respectively on the electrical leads 107 and 108 which produce a positive going pulse 147 at the output of NAND gate No. 3T, which pulse is shown on line 19' of FIG. 3a. This pulse 147 appears on lead 109 and is inverted by inverter 111 to produce the pulse 148 shown on line 20' of FIG. 3a on lead 112. This negative going pulse 148 on lead 112 will cause flip-flop FF–D to go from a one (1) state to a zero (0) state and simultaneously there will be caused on the lead 113 a change in state from a one (1) state to a zero (0) state. This is depicted at point 149 on line 21' of FIG. 3a. The negative going state will cause flip-flop FF–E to be driven into a one (1) state, which output will appear on lead 115 emanating from flip-flop FF–E. This is shown as a change in state at point 151 on line 23' of FIG. 3a. Of course, the flip-flop FF–F will remain in a zero (0) state, as shown on line 25' of FIG. 3a.

At this point it is of importance to look at the inputs to the NAND gate 131 of the axle number per truck decoder 130. These inputs and the nature of these inputs will be discussed in the order in which they appear in FIG. 2 from top to bottom, namely, $\overline{FF-A}$, FF–B, $\overline{FF-C}$, $\overline{FF-D}$ and FF–E. If all of these inputs are in the one (1) state, then the output from the NAND gate 131 will be a negative going pulse on lead 132 to flip-flop FF–G. Accordingly, these inputs may be ascertained by tracing in a vertical direction with the eye the timing chart of FIG. 3 and noting the states of various conditions present on the leads that enter this NAND gate 131. The lead designated by the reference numeral 104 which carries the output $\overline{FF-A}$ originates in flip-flop FF–A, and if one looks to line 9' of FIG. 3 and point 152 thereon, it will be noted that the output on this lead is in a one (1) state. In a similar fashion, the next input to the NAND gate 131 is FF–B which is delivered over the leads 91c and 91 from flip-flop FF–B. The state of this input to the NAND gate 131 is set forth in line 10' of FIG. 3 at the point designated by the reference numeral 153 and is a one (1) state.

The next input to the NAND gate 131 to be studied will be the $\overline{FF-C}$, which input is carried over the electrical lead 93 from the flip-flop FF–C. This signal will be found in FIG. 3 on line 12' thereof. Reference numeral 154 designates that point on the curve of line 12' which is pertinent and it is seen that this input is also at a one (1) state.

The next input to the NAND gate 131 is that of $\overline{FF-D}$, which input is carried over the lead 114 from flip-flop FF–D. Looking at line 22' of FIG. 3a it will be noted that at point 156 on this curve the output of $\overline{FF-D}$ is at a one (1) state. The last input to the NAND gate 131 which appears as an input FF–E is delivered over the leads 115, 115a from the flip-flop FF–E. The state of this input will be seen at point 151 on the curve of the output of FF–E shown on line 23' of FIG. 3a, and this is also in a one (1) state.

It can now be seen that all the inputs from the NAND gate 131 are in a one (1) state which results in a negative going pulse on lead 132 of the NAND gate 131. This negative going pulse is depicted on line 31' of FIG. 3a and is designated by the reference numeral 157. This produces a change in state of the flip-flop FF–G, as noted earlier, causing the flip-flop FF–G to go from a zero (0) to a one (1) state. The zero (0) state is its set condition and the condition which the flip-flop FF–G was at the point in time before the negative going pulse on lead 132 was delivered thereto. This one (1) state of the output present on the lead 133 on the flip-flop FF–G is shown on line 32' of FIG. 3a at the point 158 on this curve in FIG. 3a.

This is a critical point in the timing chart for it is the appearance of this signal on lead 133 from the flip-flop FF–G that indicates the presence of a two-axle truck. This output on lead 133 will now be discussed in more detail to show the effect on the system of the detection of the passage of a two-axle truck past both the first wheel deector 71 and the second wheel detector 72. The detection of the passage of a pair of two-axle trucks is to condition the leading truck axle counter decoder 96 as well as the trailing truck axle counter decoder 120 to respectively allow the leading truck axle decoder to reset the leading truck axle counter 88 as well as to condition the trailing truck axle counter decoder 120 to indicate the passage of a train car having a pair of two-axle trucks. Note at the bottom of FIG. 3a that the output on the lead 133, namely, FF–G, shown on line 32' of FIG. 3a, will remain at a one (1) state until the subsequent passage of the remaining axles on the train car 11. The system operation will now be explained with reference to the passage of the wheels 33 and 38 past both wheel detector 71 and wheel detector 72.

It should be noted that because of the unique spacing of the wheel detectors 71 and 72, the wheels and their related axles of the truck 21 have passed both the wheel detector X and the wheel detector Y before the second set of wheels 33 and 38 have reached the wheel detector X. As the vehicle 11 continues its movement it will be seen that on line 1' of FIG. 3 a pulse 159 will be present and this pulse will cause the NAND gate No. 1L to pass a negative going pulse 161 shown on line 4' of FIG. 3. Since the operation of the leading truck axle NAND circuit 76 has been explained in detail earlier, no further mention will be made of the states and change in states necessary to cause the NAND gates of the leading truck axle NAND circuit to function, as it is deemed from this point on the operation is obvious. Accordingly, the presence of the pulse 161 on the lead 82 from the NAND gate No. 1L coupled with the constant presence of a one (1) on lead 83 will produce a positive going pulse 162 on lead 84 which in turn will be inverted by inverter 86, producing a negative going pulse 163, the pulses 162 and 163 shown respectively on lines 6' and 7' of FIG. 3. The appearance of the negative going pulse on lead 87 will cause flip-flop FF–A to go from a zero (0) state to a one (1) state as shown by reference numeral 164 on line 8' of FIG. 3. It will be appreciated that at this point in time the output from flip-flop FF–B will remain in a counting state of one (1) and the flip-flop FF–C will continue to remain in its zero (0) state as shown respectively on lines 10' and 11' of FIG. 3.

Upon the passage of the wheel 33 of truck 22 the leading truck axle counter 88 will have a state of one (1) in flip-flop FF–A, a state of one (1) in flip-flop FF–B, and a zero (0) state present in flip-flop FF–C. It is obvious, of course, that the appearance of the pulse produced by wheel detector 71 will have no effect on the trailing truck axle NAND circuit 106 or the components contained within the second counter unit 105 as long as the train is traveling to the east.

The next significant pulse to be reviewed will be that pulse generated at the wheel detector 71 shown on line 1' of FIG. 3 as a pulse 166. The presence of this pulse 166 in a similar fashion to the manner described with reference to the pulse 159, line 1' of FIG. 3, will cause a pulse 167 shown on line 4' of FIG. 3 to appear on lead 82 of NAND gate No. 1L. This pulse in turn will cause a pulse 168 to appear at the NAND gate No. 3L, shown on line 6' of FIG. 3, and this in turn will cause a negative going pulse 169 to appear at the output of the inverter 86. This pulse 169 is shown on line 7' of FIG. 3 and will appear on lead 87 and cause the flip-flop FF–A to go from a one (1) state to a zero (0) state as designated by the reference numeral 171 shown on line 8' of FIG. 3. This, of course, will cause a negative going condition to appear on the lead 89 of the flip-flop FF–B, which will in turn cause the flip-flop FF–B to go from a one (1) state to a zero (0) state as is shown by the reference numeral 177 on line 10' of FIG. 3. The negative going nature of this signal on the output of the flip-flop FF–B on leads 91 and 91a will cause the flip-flop FF–C to go from a zero (0) state to a one (1) state. At the instant when the flip-flop FF–C goes from a zero (0) state to a one (1) state, there will appear on the lead 92 a positive going pulse 178 which is shown on line 11' of FIG. 3, and this will cause two simultaneous conditions to transpire.

In the first instance, the positive going pulse 178 shown on line 11' of FIG. 3 appearing on lead 92 from the flip-flop FF–C will appear as an input to the NAND gate No. 1LD of the leading truck axle counter decoder 96. Attention should be directed now to the pulse 179 on line 12' of FIG. 3. This negative going pulse 179 will appear as one of the inputs over lead 93 to the NAND gate 131 of the axle number per truck decoder 130. This quite obviously will create no effect on the output of the NAND gate 131 because the output on lead 32 of the NAND gate 131 has returned to a one (1) state, but it should be appreciated that the positive going condition appearing on the lead 92 from the flip-flop FF–C will cause to appear on the inputs of the NAND gate No. 1LD a one (1) state. Since the flip-flop FF–G of the axle number per truck decoder 130 has caused a one (1) state to appear on the leads 133, 133a, there are then present at the inputs to the NAND gate No. 1LD a pair of one (1) states which produce a zero (0) state on the lead 97 from the NAND gate No. 1LD. In a similar fashion, since the flip-flop FF–B has gone from a one (1) count to a zero (0) count, as shown by the reference numeral 177 on line 10' of FIG. 3, there will be a zero (0) input over leads 91, 91b to the NAND gate No. 2LD of the leading truck axle counter decoder 96.

In view of the fact that all the inputs to the NAND gate No. 2LD must be in a one (1) state before the output on lead 98 from this NAND gate becomes a zero (0), there will be in this instance a one (1) state present on lead 98. Therefore, the NAND gate No. 3LD of the leading truck axle counter decoder 96 will have inputs such that there is a zero (0) state and a one (1) state present producing a one (1) state on lead 99 from NAND gate No. 3LD. The outputs from the NAND gate No. 1LD on lead 97 are designated by the reference numeral 181 on line 13' of FIG. 3 while the output from the NAND gate No. 3LD which appears on lead 99 will be designated by the reference numeral 182 as shown on line 15' of FIG. 3. Of course the signal on lead 99 passing through the inverter 101 will appear as a negative going pulse 183 as shown on line 16' of FIG. 3. This negative going pulse will be carried by the leads 102, 102a, 102b, 102c, 102d, respectively, to the flip-flops FF–C, FF–B, FF–A and will reset these flip-flops to a zero (0) count state.

It will now be appreciated that all four axles of the pair of axles of trucks 21 and 22 have now passed the wheel detector 71 and the leading truck axle counter 88 has now made a full count of four axles and has returned to a zero (0) state.

Because of the unique spacing of the wheel detectors 71 and 72, the wheel detector 72 will record the passage of wheel 33 of truck 22 before wheel detector 71 will see the first wheel 51 of the first three-axle truck of train car 12. This will be evident when the line 2' of FIG. 3 is perused and the pulse 184 is seen just shortly preceding in time the pulse 186 shown on line 1'. The appearance of the pulse 184 will, in a fashion similar to that described with reference to pulses 141 and 142, place the trailing truck axle counter 116 and its related flip-flops in a state where the flip-flop FF–D and flip-flop FF–E are in a one (1) state, while flip-flop FF–F is in the zero (0) state. From this point on in the description, the precise description of the appearance of pulses at the NAND gate of the trailing truck axle NAND circuit will be omitted for it is believed evident by now that whenever a wheel passes wheel detector 71 or wheel detector 72 there will be a change in state in the respective truck axle counters 88 and 116. Accordingly, the illustration set forth in FIG. 3 is deemed ample evidence of the precise function of the circuit components present in FIG. 2. Therefore, the passage of each wheel and its related axle will only be discussed to the extent that they will be noted as having passed the wheel detector 71 or the wheel detector 72 and only where the functions of the leading truck axle counter decoder 96 and the trailing truck axle counter decoder 120 becomes significant will the description then focus on the functioning of these last two noted components, thereby reducing the verbiage necessary to complete the description, as it is felt that the timing chart of FIG. 3 is ample description of the exact function of the entire circuit shown in FIG. 2.

Once the pulse 184 on line 2' of FIG. 3, which is representative of the passage of the wheel 33 past the wheel detector 72, has appeared, the next pulse that is of significance is pulse 186 shown on line 1' of FIG. 3 which is indicative of the passage of the first wheel 51 of truck 42 past wheel detector 71, and this pulse will place in the leading truck axle counter a counting state of one (1) in the flip-flop FF–A while flip-flops FF–B and FF–C will remain in a counting state of zero (0). The next pulse that is significant will be pulse 187 shown in line 2' of FIG. 3 which will be the fourth pulse detected by wheel detector 72 and will be indicative of the passage of the last wheel 38 of the truck 22 of the train car 11.

This pulse 187 is of prime significance for it heralds the passage of the first car, and its subsequent effect on components in the system will be discussed in more detail at this point.

At the instant wheel 38 passes wheel detector 72 and the pulse 187 appears, there will then be present in the trailing truck axle counter 116 a counting state of four (4); in other words, flip-flop FF–D will go to a zero (0) condition as shown by the reference numeral 188 on line 21' of FIG. 3a, flip-flop FF–E will go to a zero (0) state as shown by reference numeral 189 on line 23' of FIG. 3a, and flip-flop FF–F will go to a one (1) state. Note that this positive going pulse 193 appears on the lead 117 from flip-flop FF–F and this positive going pulse is present on the leads 117 and 117a.

Attention is now directed to the output of the flip-flop FF–G in the axle number per truck decoder 130, which output is shown on line 32' of FIG. 3a. Note that the point in time when the output from flip-flop FF–F is in a positive going state, the output from the flip-flop FF–G is in a positive or one (1) state as shown by the reference numeral 191 on line 32' of FIG. 3a. Therefore, there is present on the inputs to the NAND gate No. 1TD a pair of ones (1's) on leads 117a and 133b which result in a zero (0) output appearing on the lead 121.

Looking now at NAND gate No. 2TD, it will be seen that there is a zero (0) pulse on the input designated FF–E which is on lead 115c, which lead 115c is coupled to lead 115 and then enters flip-flop FF–E. Accordingly, there is a one (1) and a zero (0) state present at the NAND gate No. 2TD and we are sure of having a one (1) state on lead 122 from the NAND gate No. 2TD. Therefore, the NAND gate No. 3TD will have a zero (0) and a one (1) as its inputs on leads 121 and 122, respectively, and this will produce a one (1) output on the lead 123 from the NAND gate No. 3TD. This one (1) state pulse will be inverted by inverter 124 which will produce a negative going pulse on the lead 125 and this negative going pulse is shown on line 30' of FIG. 3a as pulse 192. Note that this pulse is going to be a very sharp distinct pulse. This is brought about because of the fact that when there appears a negative going pulse on the lead 125 there will also be present on the lead 125b a negative going pulse coupled to the flip-flops FF–D, FF–E and FF–F by the leads 125f, 125e, 125d and 125c, and these flip-flops will all be reset by the negative going portion of this pulse 192. This in turn will drive the flip-flop FF–F to a zero (0) state instantly bringing the output of flip-flop FF–F, shown as pulse 193, to a zero (0) state.

The pulse 192, shown in line 30' of FIG. 3a, is a very important pulse because it heralds the passage of the first train car 11. This pulse not only resets the trailing truck axle counter 116 to ready this counter for the count of the subsequent axles and wheels on the next following vehicle, but this output on lead 125 is coupled via the lead 125a to the flip-flop FF–G of the axle number per truck decoder 130 and brings the flip-flop FF–G back to its initial state. That state, it will be recalled, is where the output on lead 133 of the flip-flop FF–G goes from a one (1) state to a zero (0) state and the output on lead 134 of the flip-flop FF–G goes from a zero (0) state to a one (1) state. This has been designated, respectively, by reference numerals 194 and 196 shown on the lines 32' and 33' of FIG. 3a.

As is noted earlier, the pulse 186 on line 1' of FIG. 3 represents the first pulse output indicative of the passage of wheel 51 of the three-axle per truck 42. In a similar fashion, the pulses 197, 198, 199, 200 and 201 all represent the consecutive passage of the wheels 53, 56, 61, 63 and 66 past the wheel detector 71 and this is shown on line 1' of FIG. 3. The pulses 202, 203, 204, 205, 206 and 207 reflect the passage of the above-noted wheels past the wheel detector 72. Of the pulses just noted, the performance of the system is the same as noted earlier with reference to the passage of the first vehicle.

The only significant pulse that is worthy of special study is the appearance of the pulse 207 shown in line 2' of FIG. 3 and this pulse appears when the last wheel 66 of the last truck 43 of the train car 12 passes the wheel detector 72. At this point in time, it will be appreciated that the trailing truck axle counter 116 is in a six (6) counting state and this places flip-flop FF–D in a zero (0) state, flip-flop FF–E in a one (1) state, and flip-flop FF–F in a one (1) state, which is the normal counting states for a three-stage counter in a counting state of six (6). When this condition is present, it will be appreciated that the trailing truck axle counter decoder 120 will have the following conditions present, namely, the NAND gate No. 1TD will have as one of its inputs a zero (0) state which is present on the lead 133b which emanates from the flip-flop FF–G of the axle number per truck decoder. This zero (0) state is shown by the reference numeral at point 208 on line 32' of FIG. 3a. The NAND gate No. 1TD will have a one (1) state output on the lead 121. A study of NAND gate No. 2TD will reveal that the inputs to this NAND gate are all of a one (1) state because flip-flop FF–E is in a one (1) state. The output on leads 115, 115c, which connects this flip-flop FF–E with the NAND gate No. 2TD. as has been noted, is in a one (1) state. The flip-flop FF–F has also been noted to be in a one (1) state and is electrically connected to this NAND gate No. 2TD over the leads 117, 117b.

It will also be seen that the last input to this NAND 2TD gate comes from the flip-flop FF–G which has a one (1) state output present on the leads 134, 134a which electrically connects this flip-flop with the NAND 2TD gate. Accordingly, there are three one (1) states present on the NAND 2TD gate and a zero (0) state will therefore appear on the electrical lead 122. The appearance of a zero (0) state on the lead 122, as well as the one (1) state that appears on lead 121, results in a one (1) state output from the NAND 3TD gate on lead 123. This one (1) state or positive going pulse on the lead 123 is shown by pulse 209 on line 29' of FIG. 3a and, as has been noted before, the inverter 124 inverts this signal to produce a negative going pulse on output lead 125. This negative going pulse is shown on line 30' of FIG. 3a as pulse 210. This negative going pulse in a fashion similar to that described earlier with reference to pulse 192 on the same line will reset the trailing truck axle counter 116 as well as insure that the flip-flop FF–G is in its initial state. Accordingly, when line 30' of FIG. 3a is studied, there will be seen that there are two pulses present, 192 and 210. Each of these pulses indicates the passage of a car and in the first instance it is a two-axle per truck vehicle and in the second instance it is indicative of the passage of a three-axle per truck vehicle. Because of the unique location of the wheel detectors 71 and 72 and the decoding system accompanying it, we have the capability of detecting the passage of any vehicle past the wheel detectors irrespective of the number of axles per truck contained therein. This system may be expanded to cover four-axle per truck cars and the spacing between the wheel detectors to accomplish this will follow precisely the same parameters set forth earlier. It would, of course, require that each of the truck axle counters 88 and 116 have a fourth stage added thereto and the logic circuitry that would be added can be supplied by those of average skill in the art.

Obviously, certain modifications and variations of the invention as hereinbefore set forth may be made without departing from the spirit and scope thereof, and therefore only such limitations should be imposed as are indicated in the appended claims.

Having thus described my invention, what I claim is:

1. A vehicle presence detector system for use where said vehicles travel along a predetermined way, where said vehicles have wheel carrying multiple axle trucks of varying number, said system including,
    (a) a pair of wheel detectors positioned apart along said way, the distance between said wheel detectors always being less than the distance between the nearest two axles on consecutive trucks on any one given vehicle and less than the distance between a first axle and a last axle on any given truck having more than two axles, said distance between wheel detectors being greater than the distance between consecutive wheels on any given truck, said wheel detectors effective to produce signals indicative of the number of axles passing said wheel detectors,
    (b) an axle count and car detection decoding means electrically coupled to said pair of wheel detectors and having an output indicative of the passing of each of the vehicles having said varying number of multiple axle trucks.

2. A vehicle presence detector system for use where said vehicles travel along a predetermined way where said vehicles have multiple axle trucks of varying number, which axles carry wheels, said vehicle presence detector system including,
    (a) a first and a second wheel detector positioned apart and along the way which said vehicle will pass, the distance between said wheel detectors always being less than the distance between the nearest two axles on consecutive trucks on any one given vehicle, and less than the distance between a first axle and a last axle on a given truck having more than two axles, said distance between wheel detectors being greater than the distance between consecutive wheels on any given truck, said wheel detectors effective to produce signals indicative of the number of axles passing said wheel detectors,
    (b) first and second counter means each having a plurality of counting states and being respectively electrically coupled to said first and said second wheel detectors to receive electrical signals indicative of the number of axles passing said first and said second wheel detectors, said electrical signals determining said counting states,
    (c) an axle number per truck decoder respectively electrically coupled to said first and said second counter means,
        said axle number per truck decoder having outputs electrically controllingly coupled to said first and said second counter means to allow said first and said second counter means to revert to an initial state whenever a vehicle has completely passed said wheel detectors,
        said second counter means having an output indicative of said vehicle passage.

3. A vehicle presence detector system for use where said vehicles travel along a predetermined way and said vehicles have two-axle trucks as well as three-axle trucks, which axles carry wheels, said vehicle presence detector system including,
(a) first and second wheel detectors positioned apart along said predetermined way which said vehicle will pass, said wheel detectors effective to detect the number of axles passing said wheel detectors,
(b) first and second counter means each having a plurality of counting states and being respectively electrically coupled to said first and said second wheel detectors to receive electrical signals indicative of the number of axles passing said first and said second wheel detectors, said electrical signals determining said counting states,
(c) an axle number per truck decoder having a first and a second state respectively electrically coupled to said first and said second counter means, said decoder changing states whenever said second counter means reaches a counting state of two and said first counter is in a counting state of two, said axle number per truck decoder having outputs indicative of said first and said second states and respectively electrically controllingly coupled to said first and said second counter means to allows said first and said second counter means to revert to an initial state whenever a vehicle has completely passed said wheel detectors, said second counter means having an output indicative said vehicle passage.

4. The vehicle presence detector system of claim 3, wherein the distance between said wheel detectors is always less than the distance between the nearest two axles on consecutive trucks on any one given vehicle and is always greater than the distance between consecutive wheels on any given truck.

5. The vehicle presence detector system of claim 3, wherein said first and said second states of said axle number per truck decoder respectively indicate the presence of a three-axle truck and a two-axle truck, said axle number per truck decoder receiving from said first and said second counter means indications of the counting states of said first and said second counter means, said first and second states of said axle number per truck decoder being directly determined by said counting states of said first and said second counter means.

6. The vehicle presence detector system of claim 3, wherein said second counter means output in addition to providing an indication of vehicle passage is also electrically controllingly coupled to said axle number per truck decoder to ensure that upon vehicle passage said decoder is in said first state.

7. The vehicle presence detector system of claim 3, wherein said first and said second counter means respectively include,
(a) first and second truck axle logic circuits respectively electrically coupled to said first and said second wheel detectors to receive said electrical signals indicative of axles passing said first and said second wheel detectors whenever said vehicle is traveling in a preselected direction,
(b) first and second three-stage counters respectively electrically coupled to said first and said second truck axle logic circuits,
(c) first and second truck axle counter decoders respectively electrically coupled to said first and said second three-stage counters, said axle number per truck decoder respectively electrically coupled to said first and said second truck axle counter decoders.

8. The vehicle presence detector system of claim 7, wherein said axle number per truck decoder includes a first logic gate and a second logic gate, said first logic gate changing from a first condition to a second condition whenever said second counter has reached said counting state of two and said first counter is in said counting state of two, thereby causing a change in state from said axle per truck decoder first state to said axle per truck decoder second state to thereby indicate the passage of a two-axle truck.

9. The vehicle presence detector system of claim 8, wherein said output of said second counting means causes said second logic gate of said axle number per truck decoder to revert to an initial state whenever a vehicle has passed.

10. A train car presence detector system for use in railway systems where there are employed train cars having two-axle trucks as well as three-axle trucks, which axles carry wheels, said train car presence detector system including,
(a) a first and a second wheel detector positioned apart and along the way which said train cars will pass, the distance between said wheel detectors always being less than the distance between the nearest two axles on consecutive trucks on any one given train car and always greater than the distance between consecutive wheels on any given truck, said wheel detectors effective to detect the number of axles passing said wheel detectors,
(b) a first counter means having a plurality of counting states and being electrically coupled to said first wheel detector to receive electrical signals indicative of the number of axles passing said first wheel detector, said electrical signals determining said counting states,
(c) a second counter means having a plurality of counting states and being electrically coupled to said second wheel detector to receive electrical signals indicative of the number of axles passing said second wheel detector, said electrical signals determining said counting states,
(d) an axle number per truck decoder which has a first and a second state respectively indicative of the presence of a three-axle truck and a two-axle truck, which decoder is electrically coupled to said first counter and said second counter means to receive an indication of said counting states of said first and said second counter means, such that when said second counter means reaches a counting state of two and said first counter means is in a counting state of two, said decoder changes from said first state to said second state, said axle number per truck decoder having outputs indicative of said first and second states and directly determined by said counting states of said first and said second counter means, said outputs being fed back to said first and said second counter means so that when a train car has completely passed each of said first and said second wheel detectors, said first and said second counter means each revert to an initial state, said second counter means having an output indicative of said train car passage, said second counter means output also electrically controllingly coupled to said axle number per truck decoder to ensure that upon a train car's passage said decoder is in said first state.

11. The train car presence detector of claim 10, wherein said first and said second counter means respectively include,
(a) first and second truck axle logic circuits respectively electrically coupled to said first and said second wheel detectors to receive said electrical signals indicative of axles passing said first and said second wheel detectors whenever said train car is traveling in a preselected direction past said wheel detectors,
(b) first and second three-stage counters respectively electrically coupled to said first and said second truck axle logic circuits,
(c) first and second truck axle counter decoders respectively electrically coupled to said first and said second three-stage counters, said axle number per truck decoder respectively electrically coupled to said first and said second truck axle counter decoders.

12. The train car presence detector of claim 11, wherein said axle number per truck decoder includes a first logic gate and a second logic gate, said first logic gate changing from a first condition to a second condition whenever said second counter has reached said counting state of two and said first counter is in said counting state of two, thereby causing change in state from said axle number per truck decoder first state to said axle number per truck second state to thereby indicate the passage of a two-axle truck.

13. The train car presence detector system of claim 12, wherein said output of said second counter means causes said second logic gate of said axle number per truck decoder to revert to said first state whenever a train car has passed.

References Cited

UNITED STATES PATENTS 3,144,225    8/1964    Suerkemper et al. _____ 246—77

ARTHUR L. LA POINT, Primary Examiner

GEORGE H. LIBMAN, Assistant Examiner

U.S. Cl. X.R.

235—150.24